(12) United States Patent
Wickham

(10) Patent No.: US 7,513,720 B2
(45) Date of Patent: Apr. 7, 2009

(54) APPARATUS AND METHOD FOR GAGING, TAPPING AND RE-CHASING THREADS IN OUT-OF-POSITION HOLES

(76) Inventor: John L. Wickham, 11752 Harford Rd., Glen Arm, MD (US) 21057

( * ) Notice: Subject to any disclaimer, the term of this patent is extended or adjusted under 35 U.S.C. 154(b) by 213 days.

(21) Appl. No.: 11/589,265

(22) Filed: Oct. 24, 2006

(65) Prior Publication Data

US 2007/0297868 A1    Dec. 27, 2007

Related U.S. Application Data

(60) Provisional application No. 60/816,847, filed on Jun. 27, 2006.

(51) Int. Cl.
*B23B 31/08* (2006.01)
(52) U.S. Cl. .......................... 408/127; 470/183; 279/16
(58) Field of Classification Search ............... 408/1 R, 408/127; 279/16–18; 464/102, 104, 106, 464/147, 149, 154–155, 171; 470/183, 197, 470/207; 81/177.75
See application file for complete search history.

(56) References Cited

U.S. PATENT DOCUMENTS

| | | | | | |
|---|---|---|---|---|---|
| 1,782,633 | A | * | 11/1930 | Schiltz | 279/16 |
| 1,907,447 | A | * | 5/1933 | Schiltz | 279/16 |
| 2,188,205 | A | * | 1/1940 | Osborne | 279/16 |
| 2,468,396 | A | * | 4/1949 | Frisco | 279/18 |
| 2,602,347 | A | | 7/1952 | Miller | 74/378 |
| 2,867,440 | A | * | 1/1959 | McLaughlin | 279/16 |
| 2,981,544 | A | * | 4/1961 | Better | 279/16 |
| 2,991,085 | A | * | 7/1961 | Lyon | 279/16 |
| 3,338,585 | A | * | 8/1967 | Poorman | 279/16 |
| 3,443,818 | A | * | 5/1969 | Fauth | 279/16 |
| 4,111,442 | A | * | 9/1978 | Wawrzyniak | 279/16 |
| 4,926,700 | A | | 5/1990 | Peplinski | 73/862.23 |
| 5,823,356 | A | | 10/1998 | Goodrich et al. | 209/601 |
| 7,059,055 | B2 | | 6/2006 | Wickham et al. | 33/199 R |

* cited by examiner

*Primary Examiner*—Daniel W Howell

(57) ABSTRACT

A device gaging, tapping and/or re-chasing threaded devices which automatically accommodates and corrects for both lateral offset and angular offset between the longitudinal axis of the threaded member of the device and the threaded member being tested.

10 Claims, 8 Drawing Sheets

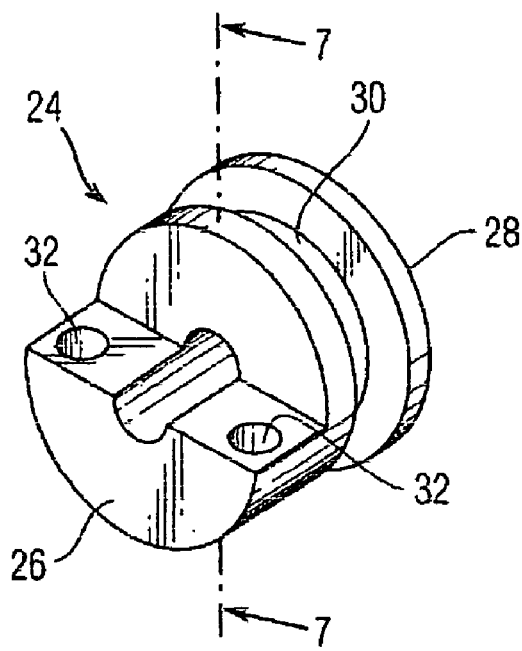
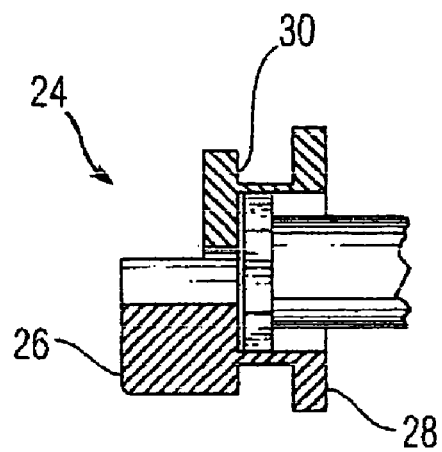
Fig. 6
Fig. 7
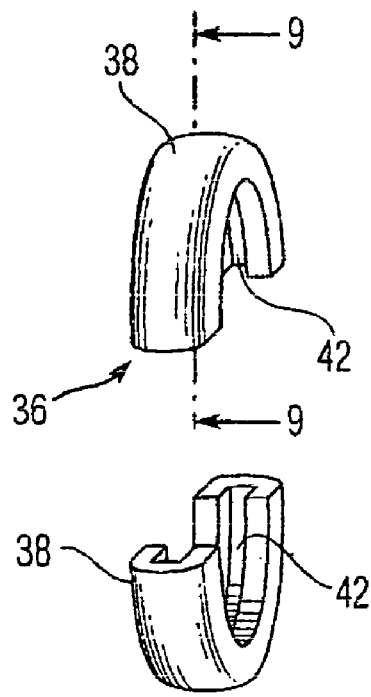
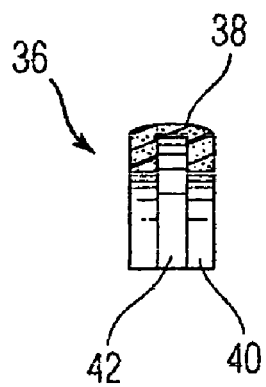
Fig. 8
Fig. 9

APPARATUS AND METHOD FOR GAGING, TAPPING AND RE-CHASING THREADS IN OUT-OF-POSITION HOLES

CROSS REFERENCE TO RELATED APPLICATIONS

This application is related to U.S. Provisional Patent Application Ser. No. 60/816,847 filed Jun. 27, 2006, the contents of which are incorporated by reference in their entirety.

BACKGROUND OF THE INVENTION

1. Field of the Invention

The present invention relates to a device to control and check the quality of threaded parts and more particularly to a high output device which automatically checks the threads in and on the threaded parts when the threaded parts are out of position axially and/or angularly with respect to the device.

2. Description of Related Art

High volume production requires superior quality control over all threaded parts to minimize down time. Problems can arise due to absence of threads, incomplete threading and incorrect threading. U.S. Pat. No. 2,602,347 to Miller disclosed a power-driven thread gage with a slip clutch used with manual operations. U.S. Pat. No. 4,926,700 to Peplinski discloses a device to test threaded blind holes. In U.S. Pat. No. 5,823,356, Goodrich et al disclose an apparatus for inspecting threaded members. Wickham et al in U.S. Pat. No. 7,059,055, disclose a high output device which rotates a threaded gage to engage a threaded part. The device is not able to engage threaded members which are misaligned longitudinally or angularly.

SUMMARY OF THE INVENTION

It is an object of the present invention to provide an automatic device which can very rapidly test every threaded part of a production run and which can automatically correct for lateral offset and angular misalignment of the threaded part with the probe on the device.

It is a further object of the present invention to detect defective threaded items which could interfere with the operation of the production line.

In accordance with the teachings of the present invention there is disclosed an apparatus for gaging, tapping and/or re-chasing threaded devices. A driven threaded member having a longitudinal axis engages a cooperating threaded member having a longitudinal axis. The longitudinal axis of the driven threaded member may be misaligned with respect to the longitudinal axis of the cooperating threaded member, thereby potentially causing a jamming or malfunction of the apparatus. An improvement has a first means for automatically accommodating and/or correcting for a lateral offset between the longitudinal axes of the respective threaded members, and a second means for automatically accommodating and/or correcting for an angular tipping or non-parallelism between the longitudinal axes of the respective threaded members.

In further accordance with the teachings of the present invention, there is disclosed an apparatus for gaging, tapping and re-chasing threads in an out-of-position threaded aperture or a first axis in a manufactured part. A cooperating threaded chaser probe on a second axis is alternately advanced within and retracted from, the threaded aperture in a relatively high-speed operation, the threaded chaser probe being part of a driven member engaged by a driving member in the apparatus. The first axis of the aperture and the second axis of the threaded chaser probe may be non-parallel and/or angularly displaced from each other. The improvement has the threaded chaser probe mounted in an adapter, the adapter being connected to the driven member. The adapter has an axial shaft disposed therein, the shaft having a first end engaging the driven member and an opposite second end engaging a probe holder. The probe holder has a flange formed thereon. A pair of semi-circular retainer halves is provided. Each retainer half has a circumferential groove formed in an internal arcuate surface thereof wherein the flange on the probe holder is loosely received in the respective grooves and the probe holder may move laterally in all directions with respect to the surrounding retainer halves. Each retainer half is formed from a material having a low coefficient of friction. The threaded chaser probe is attached to the probe holder. A resilient member is disposed around the axial shaft contacting the flange on the probe holder. In this manner, the threaded chaser probe may move laterally and angularly with respect to the apparatus to align with threaded aperture.

Additionally, in accordance with the teaching os the present invention, there is disclosed a method for gaging, tapping and/or re-chasing threaded devices. A driven threaded member having a longitudinal axis engages a cooperating threaded member having a longitudinal axis. The longitudinal axis of the driven threaded member may be misaligned with respect to the longitudinal axis of the cooperating threaded member. There is provided a first means for automatically accommodating and/or correcting for a lateral offset between the longitudinal axis of the respective threaded members and a second means for automatically accommodating and/or correcting for an angular tipping or non-parallelism between the longitudinal axes of the respective threaded member.

These and other objects of the present invention will become apparent from a reading of the following specification taken in conjunction with the enclosed drawings.

BRIEF DESCRIPTION OF THE DRAWINGS

FIG. 6 is a perspective view of the probe holder.

FIG. 7 is a cross-sectional view taken across the lines 7-7 of FIG. 6.

FIG. 8 is a perspective view of two retainer halves facing one another.

FIG. 9 is a cross-sectional view taken across the lines 9-9 of FIG. 8.

DESCRIPTION OF THE PREFERRED EMBODIMENTS

Figure 1:
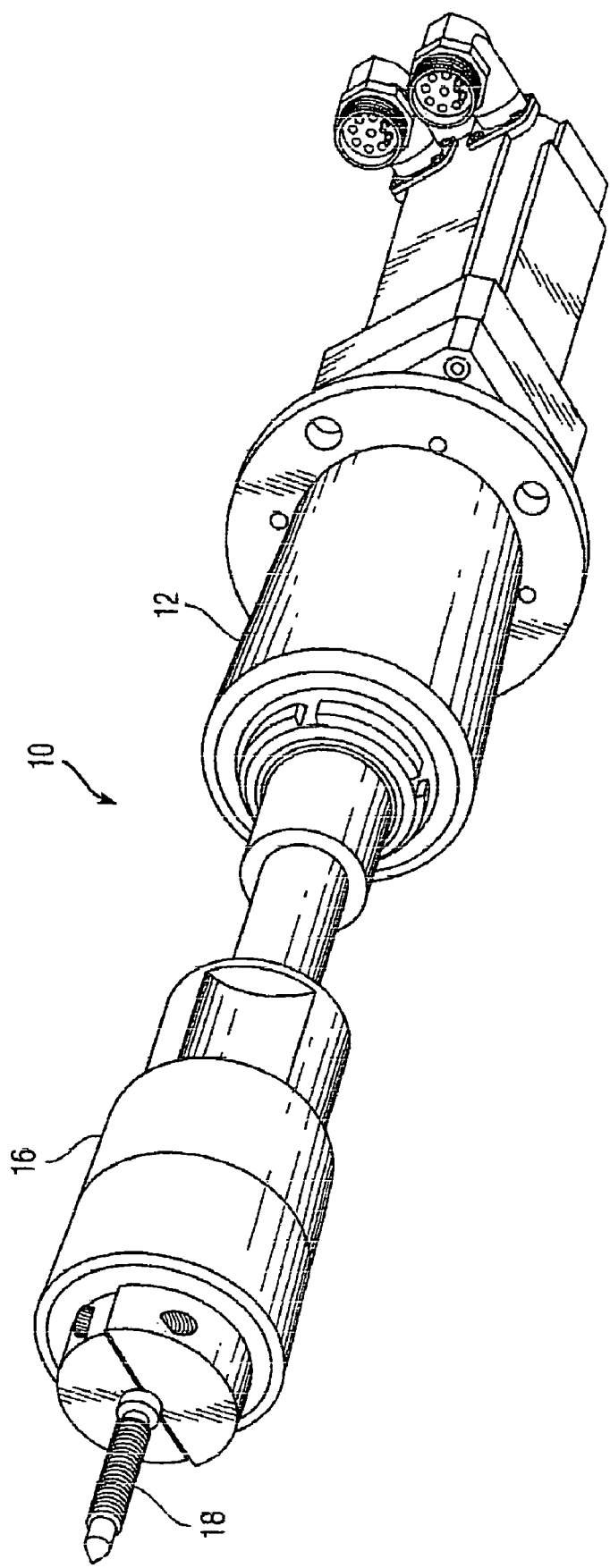
FIG. 1 is a perspective view of the device of the present invention.
Figure 2:
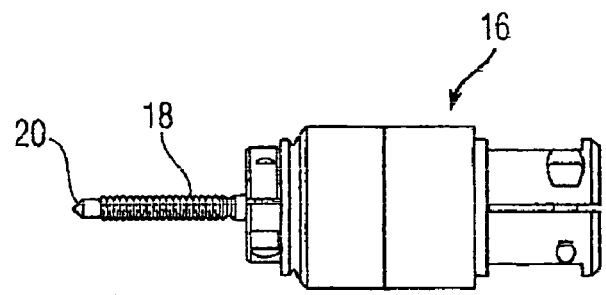
FIG. 2 is a side elevation view of the adapter.
Figure 3:
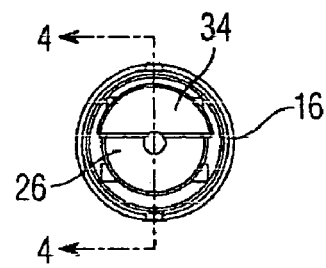
FIG. 3 is an end view of FIG. 2.

Referring now to FIGS. 1-5, the device 10 has a housing 12 containing a motor and clutch which are connected to a drive shaft 14 extending outwardly from the housing. The drive shaft 14 is connected to the first end of an adapter 16. Extending from the opposite second end of the adapter 16 is a driven threaded member (or chaser probe) 18. The probe 18 has threads of a selected size to cooperate with a threaded part which is to be sized, gaged, tapped or re-chased. Although the disclosure herein is directed to a threaded part having internal threads (such as a nut) and a probe having external threads, the present invention is also for a threaded part having external threads (such as a bolt) and a probe having internal threads.

The probe 18 is aligned with the part to be sized, gaged, tapped or re-chased and the motor drives the clutch to drive the probe. The device is used in high speed, high volume procedures with a test cycle time being approximately one second or less per test item.

Figure 15:
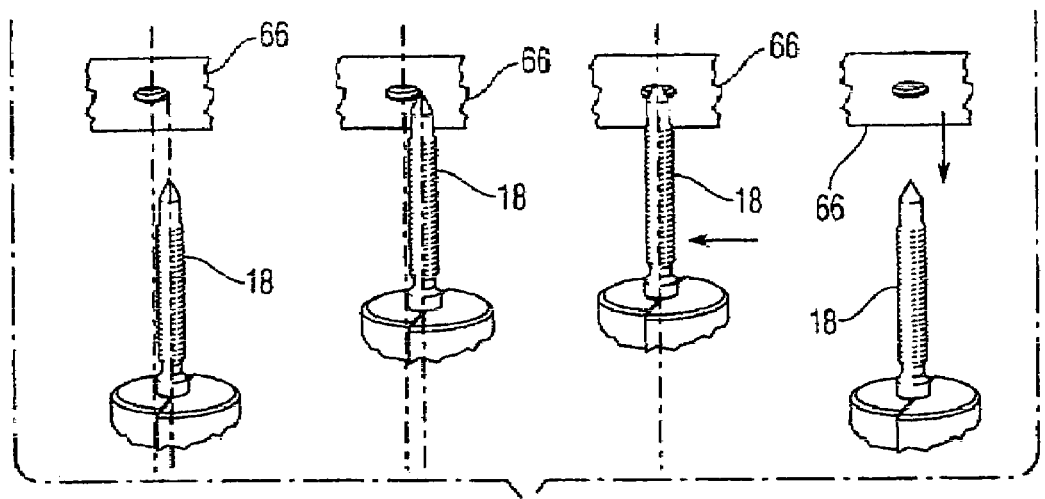
FIG. 15 is a sequence showing the probe being automatically aligned longitudinally with the test item.
Figure 16:
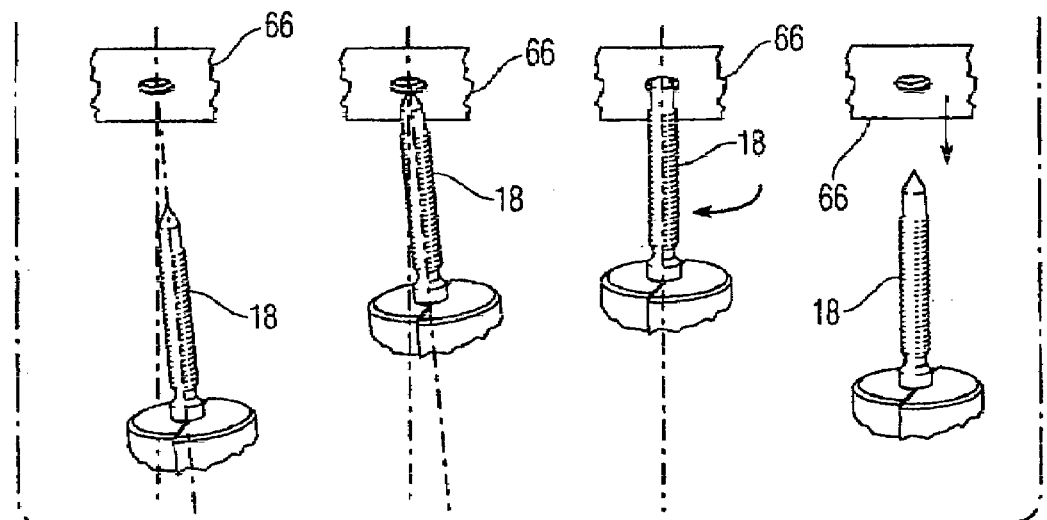
FIG. 16 is a sequence showing the probe being automatically aligned angularly with the test item.
Figure 17:
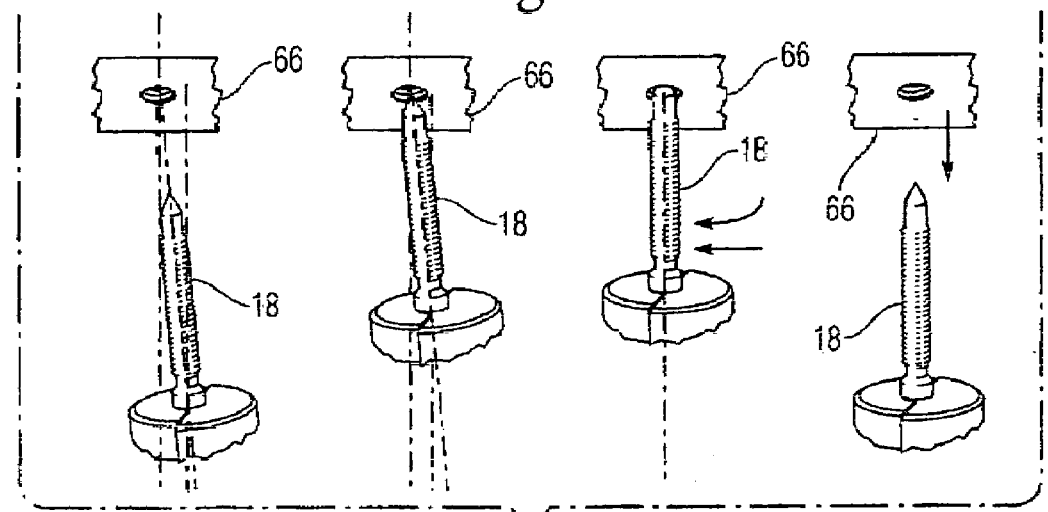
FIG. 17 is a sequence showing the probe automatically being aligned both longitudinally and angularly with the test item.
Figure 18:
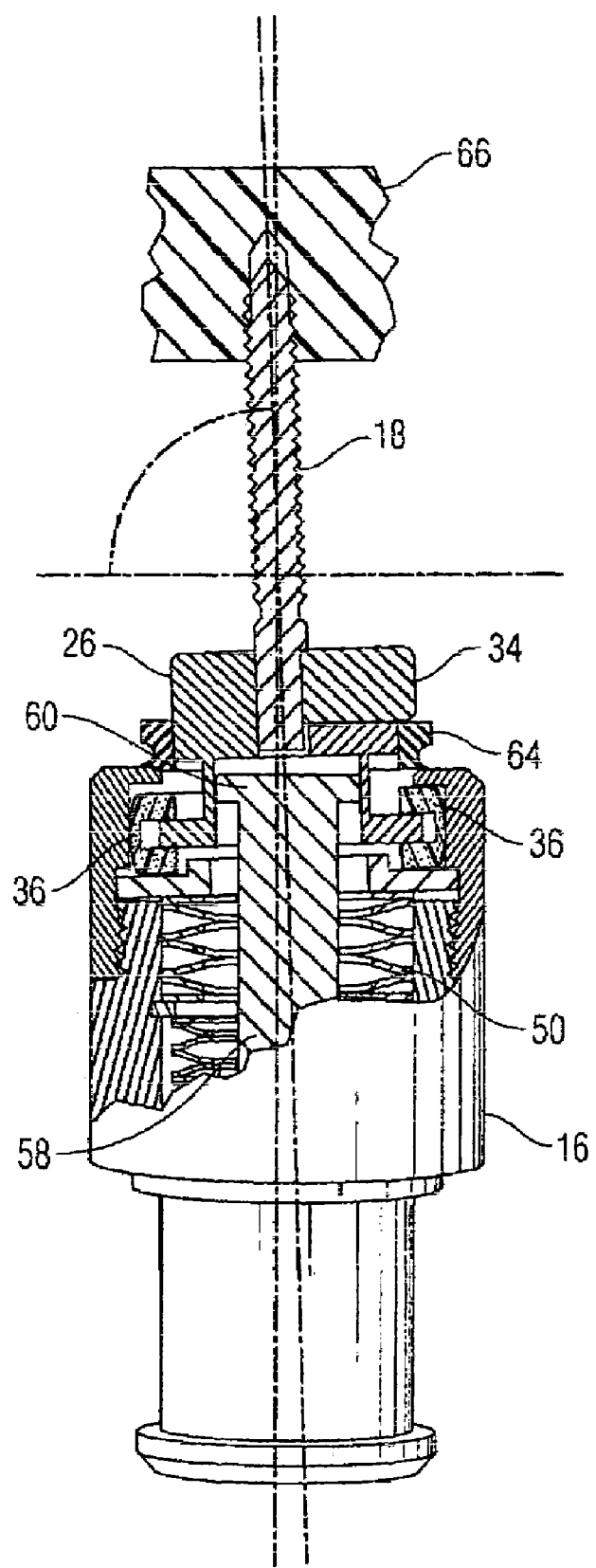
FIG. 18 is a partial cross-section view of the adapter and the probe received in the test item with the angular offset spring urging the probe to correct angular misalignment.

The items to be sized, gaged, tapped or re-chased are frequently misaligned axially and/or angularly with respect to the probe 18. That is, as shown in FIGS. 15-17, the longitudinal axis of the probe 18 is misaligned with respect to the longitudinal axis of the cooperated threaded part. The respective axes may be parallel, but displaced from one another by a fraction of an inch. This misalignment is sufficient to potentially cause a jamming or malfunction of the apparatus. Alternately, the axes may not be parallel, but may be angularly displaced or "tipped" with respect to one another.

In a preferred embodiment, the probe 18 has a first end which is conical 20 and guides the probe into the item to be tested. The opposite second end of the probe 18 has a D-shape 22, one surface being half-round and the opposite surface being flat. The probe 18 is threaded between the first end 20 and the second end 22, the threads being selected to cooperate with the threads in the item to be tested.

The second end 22 of the probe 18 is received in probe holder 25 (FIGS. 6, 7). The probe holder 24 is a cylindrical member having a semi-cylindrical extension 26 on one side, a flange 28 on the opposite side and an undercut portion 30 adjacent to the flange 28. The under cut portion 30 is between the cylindrical portion of the probe holder 24 and the flange 28. The semi-cylindrical extension 26 has a first portion in which there is formed a semi-cylindrical channel to receive the cooperating half-round portion of the probe 18. Preferably, a separated pair of openings 32 are formed transversely in the semi-cylindrical extension 26 to receive a pair of screws therein. The screws extend out of the semi-cylindrical extension 26 and engage corresponding threaded openings in a semi-cylindrical clamp member 34 which has a flat portion. The flat portion of the semi-cylindrical clamp member 34 is disposed facing the flat portion of the semi-cylindrical extension 26 and abuts the flat surface of the D on the probe 18. In this manner, the probe 18 is secured to the probe holder 24.

The probe holder 24 is disposed in an adapter 16 which is a tubular body having a larger diameter opening at one end than at the other end. Between the ends, the opening is further reduced to a polygonal shape to receive therein the cooperating polygonal end of a shaft as will be disclosed. The probe holder 24 is disposed in the larger diameter opening with the flange 28 within the opening and the probe 18 extending outwardly from the adapter 16.

Figure 10:
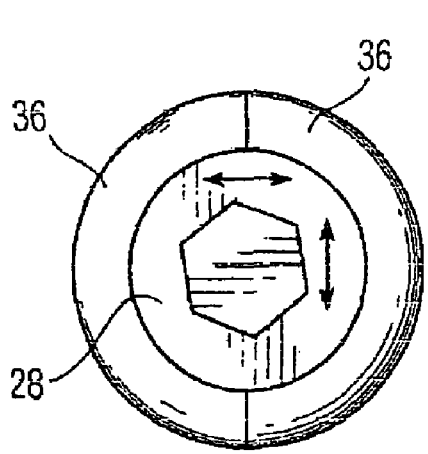
FIG. 10 is an end view showing the flange of the probe holder disposed in the grooves in the retainer halves, the flange being laterally movable in all directions.
Figure 11:
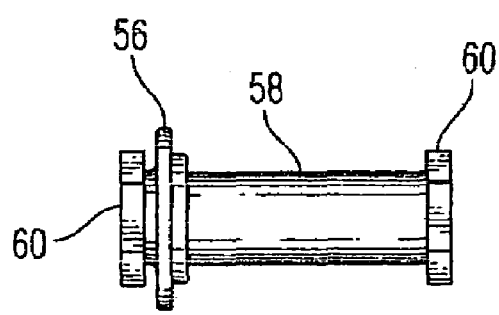
FIG. 11 is a side elevation view of the dog-bone shaft.
Figure 12:
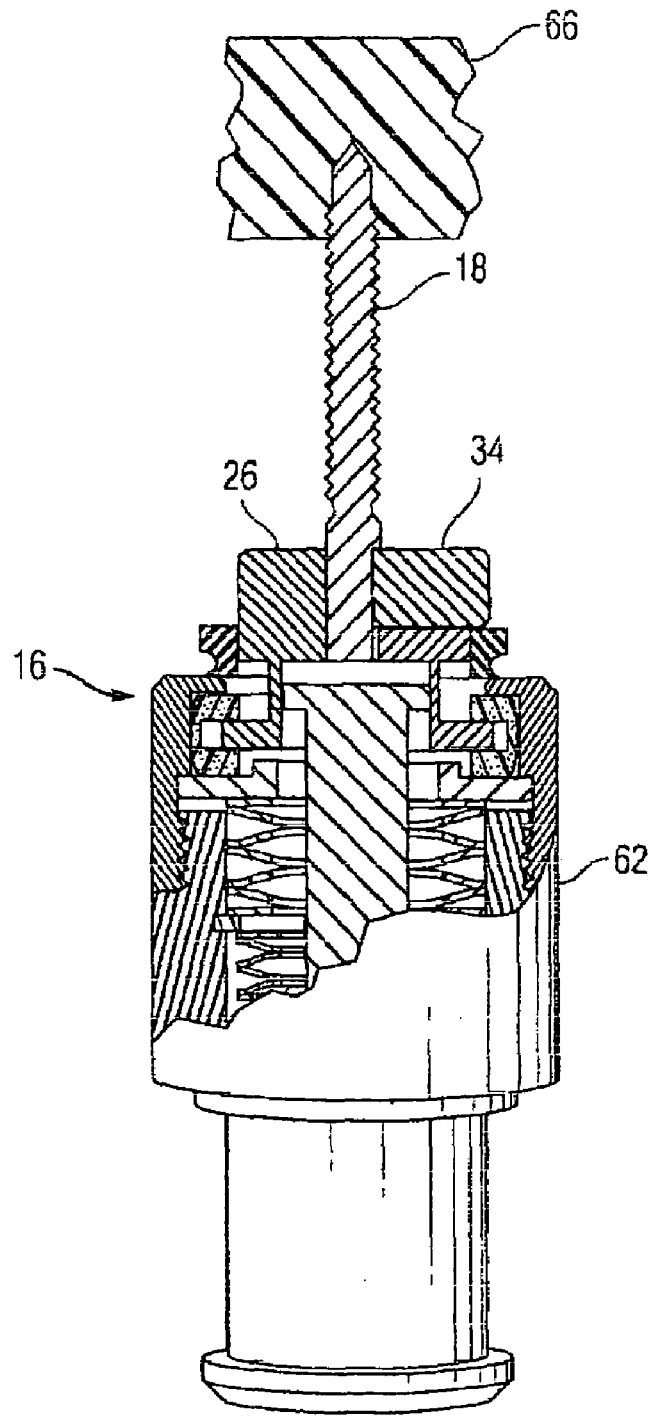
FIGS. 12 is a partial cross-sectional view of the adapter and probe of the present invention aligned with a test item.
Figure 13:
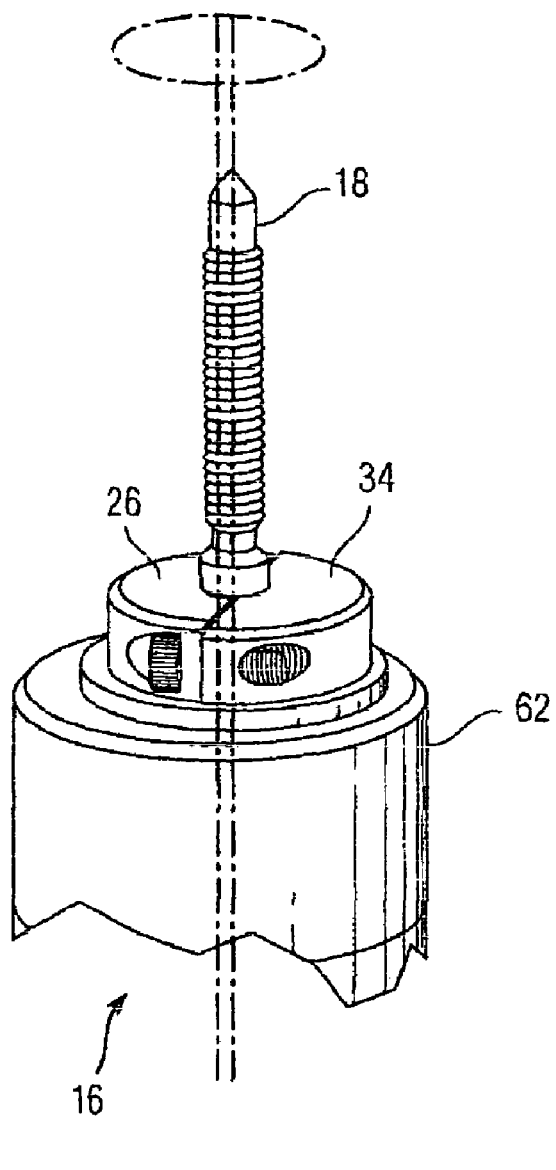
FIG. 13 is a perspective view of the probe misaligned longitudinally with the test item.

A pair of semicircular retainer halves 36 are disposed over the flange 28 on the probe holder 24 (FIG. 8). Each retainer half 36 half has an outer peripheral arcuate surface 38 and an opposite inner peripheral acuate surface 40. On each retainer half 36, the outer surface 38 is formed with a crown (FIG. 9). Each inner peripheral arcuate surface 40 has a circumferential groove 42 formed therein. Each retainer half is formed from a material having a low coefficient of friction. A phenolic invested with PTFE has been used successfully as a strong low friction material. The flange 28 on the probe holder 24 slides very smoothly within the grooves in the retainer halves. The retainer halves 36 are disposed on the flange 28 of the probe holder 24 with the flange 28 being received in the grooves in the inner peripheral surfaces. The width of the grooves is greater than the thickness of the flange. When the retainer halves 36 are disposed opposite one another to form a ring, the diameter of the resultant circle formed by the grooves 42 is greater than the diameter of the flange 28 preferably by approximately 0.150 inches. In this manner, the probe holder 24 may move laterally in any direction with respect to adapter (FIGS. 10, 13). This lateral movement produces concomitant movement of the chaser probe 18.

Figure 14:
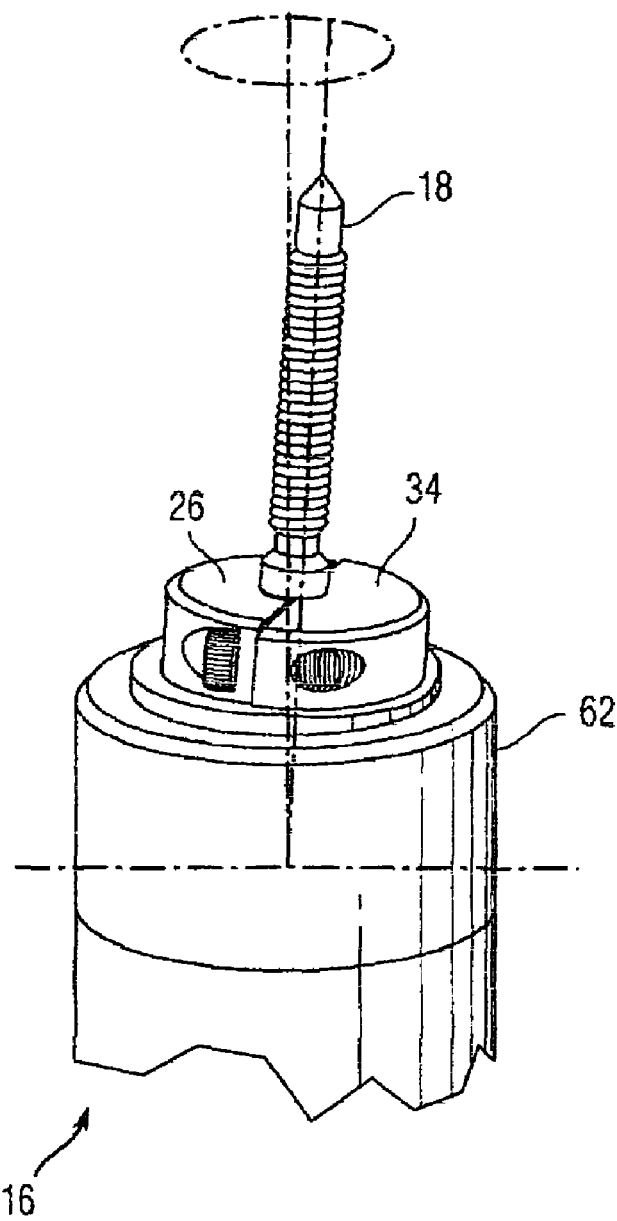
FIG. 14 is a perspective view of the probe misaligned angularly with the test item.

The crowned outer peripheral arcuate surface 38 of each retainer half 36 is adjacent to the inner surface of the adapter 16. The inner surface of the adapter 16 has no curvature so the retainer halves 36 may be at a small angle with respect to the longitudinal axis of the adapter 16. When this angulation is combined with the freedom of movement of the flange 28 in the grooves 42 in the retainer halves due to the grooves being wider than the thickness of the flange, the result is that the probe holder 24 may "tip" or be movable at an angle with respect to the longitudinal axis of the adapter 16. This "tipping" or angular movement is transmitted to the chaser probe 18 (FIG. 14).

Figure 4:
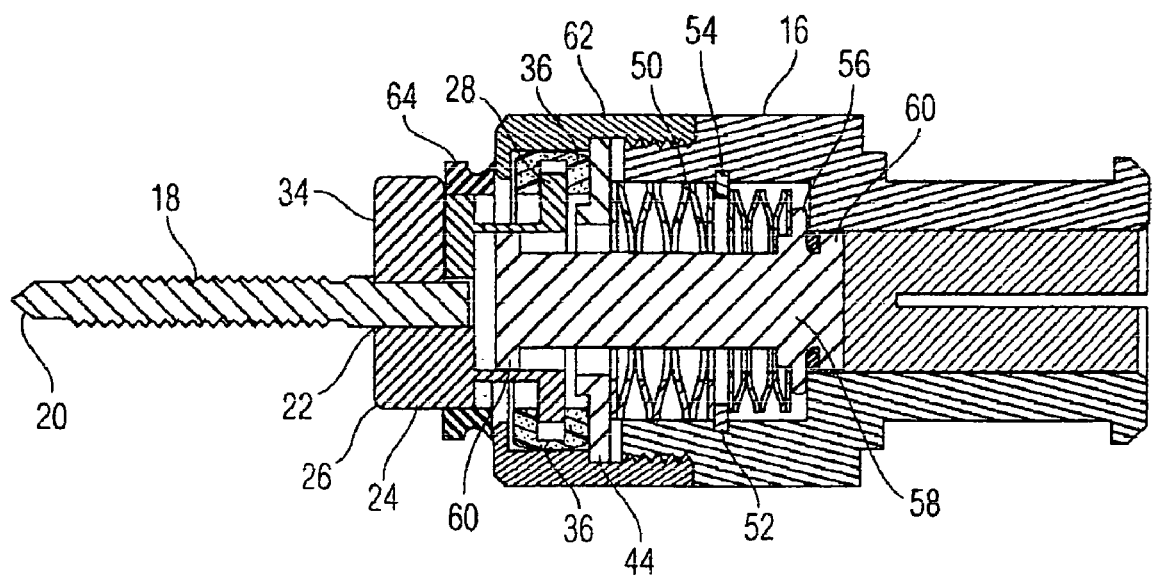
FIG. 4 is a cross-sectional view taken across the lines 4-4 of FIG. 3.
Figure 5:
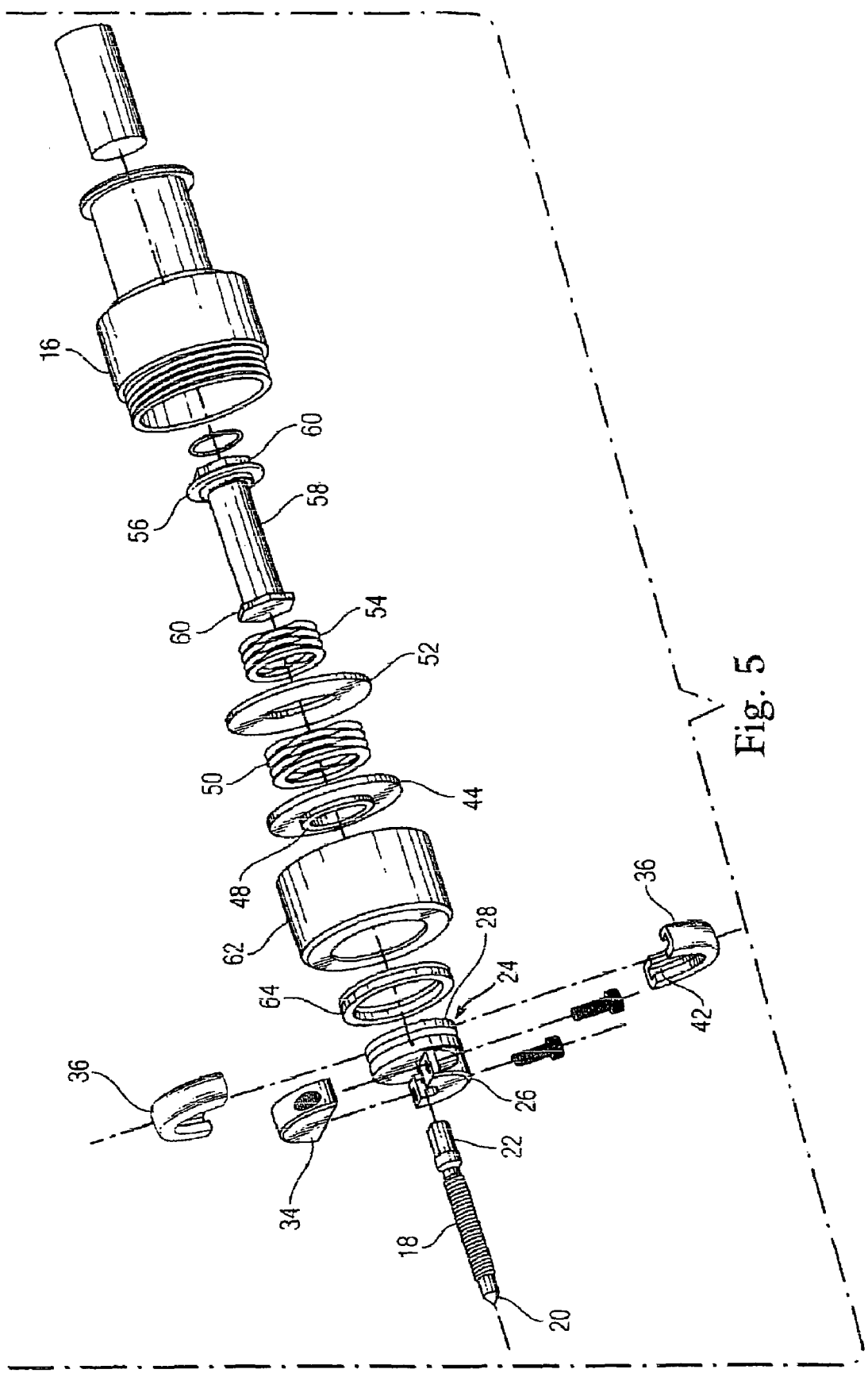
FIG. 5 is an exploded view of the adapter and the components therein.

Butted against the flange 28 within the adapter 16, there is a washer-like spring perch 44 with a center opening. The spring perch 44 has a flat surface 46 adjacent to the flange. The opposite side of the spring perch 44 has a circular rim 48 formed around the opening (FIG. 4). An angular offset spring (resilient member) 50 is disposed adjacent to the spring perch 44 wherein the rim of the spring perch 44 is received in the inner diameter of the spring 50 at one end of the spring. The opposite end of the spring 50 abuts a washer 52 which, in turn, abuts a second washer 53 held in place with a retaining ring. An axial offset spring 54 is disposed having one end adjacent to the second washer. The opposite end of the axial offset spring 54 contacts a flange 56 formed on an axial dog-bone shaft 58 (FIG. 10). Each end 60 of the dog-bone shaft 58 has an engaging means such as a polygonal shape. Preferably, the polygon is a hexagon. The first end of the dog-bone shaft 60 engages a cooperating engaging means (a polygonal opening) formed internally in the adapter as previously noted. The shaft 58 is received in the axial offset spring 54, the second washer 53, the washer 52, the angular offset spring 50 and the spring perch 44. The flange 28 on the probe holder 24 has formed in the center of the surface adjoining the spring perch 44, a polygonal cut-out portion which corresponds to the polygonal end 60 of the dog-bone shaft.

In this manner, drive from the drive shaft 14 is transmitted through the adapter to the chaser probe 18.

The outer circumference of the adapter 16 at the end around the probe holder 24 is threaded. A cap-like nose piece 62 having a cooperating threaded inner surface is disposed over the end of the adapter 16. The nose piece 62 retains the probe holder 24 in the adapter 16. The nose piece 62 has an opening formed in the top thereof through which the chaser probe 18 extends.

A dirt seal 64 is disposed around the probe holder 24 and clamp member 34. The dirt seal is formed from a flexible material and has two rings joined circumferentially at a base. The base adjoins the probe holder and the rings extend outwardly therefrom. One ring contact the nose piece 62 and seals the interface of the nose piece 62 with the probe holder.

Thus, in a typical use (FIGS. 13-18), the apparatus of the present invention is set up with the chaser probe oriented perpendicular to a line of threaded items to be tested. The items to be tested have respective longitudinal axes which are approximately parallel to the longitudinal axis of the chaser probe. The line of items 66 to be tested moves at a high rate of speed perpendicularly to the longitudinal axis of the chaser probe. The apparatus of the present invention is activated to move the chaser probe forwardly to engage an item to be tested and to retract very rapidly; the process being repeated at least one item per second.

In many instances, the longitudinal axis of the item to be tested is not exactly aligned with the longitudinal axis of the chaser probe. If the chaser probe is advanced, there is the potential of jamming or malfunctioning of the apparatus. The present invention is to remedy this potential problem.

Because of the design of the present invention with the flange 28 of the probe holder 24 being movable laterally, the conical tip 20 of the adapter probe initiates an initial entry into the item 66 to be tested and the probe holder 24 automatically slides within the adapter to align the longitudinal axis of the chaser probe with the longitudinal axis of the item to be tested, correcting for any lateral offset of the respective axes.

In some instances, the longitudinal axis of the chaser probe 18 is angularly displaced from the longitudinal axis of the item 66 to be tested. Due to the spacing between the flange 28 on the probe holder 24 and the retainer halves 36 and the crowned outer peripheral arcuate surface 38 of the retainer halves, the probe holder, and the connected chaser probe 18 may tilt or be angularly displaced. This angular displacement is further produced by the angular offset spring 50 which urges the spring perch 44 against the flange 28 on probe holder 24. As a result of these structural features, the chaser probe 18 may be angularly displaced (for example by ±0.020 inches) even though the side pressure is applied at a considerable cantilever distance.

Many times the longitudinal axis of the chaser probe 18 is displaced both longitudinally and axially from the longitudinal axis of the item 66 to be tested. The present invention accommodates both of these offset conditions simultaneously. The adapter probe 18 is displaced both angularly and longitudinally at the same time.

It is preferred that as the chaser probe 18 approaches an off-axis hole in an item 66 (or an off-axis threaded feature), the probe 18 would move sideways yet parallel with the axis of the driver as the probe tip is pushed sideways in its attempt to enter an off-axis hole. The probe remains parallel with the axis of the driver. In many cases, the hole is substantially out-of-position but only slightly off-angle. After the probe has entered the hole it engages the thread, and only then does the probe accommodate to the angular displacement of the hole so it can follow the hole. This is important because if the hole is substantially off-axis, and the probe were to deflect angularly before moving longitudinally, the probe may cross thread at the mouth of the hole and cause the device to jam.

In most situations, the off-axis (longitudinal) variation is frequently rather large while the angular variation is only small to moderate. Note that some angular compliance is usually necessary because the axis of the threaded holes will almost never be perfectly parallel with the axis of the driver, and the gaging member (the probe 18) necessarily fits so snugly in the threaded hole that, if the apparatus doesn't have angular compliance, the apparatus will jam.

With the present invention, the maximum amount of available parallel offset compliance is determined, or is set, by the amount that the internal groove diameter in the retainer holes 36 is larger than the outer diameter of the flange 28 which is received in the internal groove 42 forming the longitudinal movement gap 66. The maximum amount of available angular compliance is determined, or is set, by the tip gap 68. This "tip" is resisted by the force exerted by the angular offset spring 50.

In order to regulate parallel compliance relative to angular compliance, the strengths of the angular offset spring 50 and of the axial offset spring 54 are selected. Making the angular offset spring 50 stronger causes the spring perch 44 more resistant to tipping. Thus, more force is required to tip the probe 18 (angular movement). Making the axial offset spring 54 weaker results in the probe 18 being easier to move off center (longitudinal movement). By providing a weak axial offset spring 54 and a strong angular offset spring 50, the output shaft (and the probe 18) will move off center to find the hole while staying parallel with the axis of the driver until the probe is threaded into the hole. Only then will the tool angularly adapt to the off-angle condition of the hole.

Obviously, many modifications may be made without departing from the basic spirit of the present invention. Accordingly, it will be appreciated by those skilled in the art that within the scope of the appended claims, the invention may be practiced other than has been specifically described herein.

What is claimed is:

1. In an apparatus for gaging, tapping and/or re-chasing threaded devices, wherein a driven threaded member having a longitudinal axis engages a cooperating threaded member having a longitudinal axis, and wherein the longitudinal axis of the driving threaded member may be misaligned with respect to the longitudinal axis of the cooperating threaded member, thereby potentially causing a jamming or malfunction of the apparatus, the improvement comprising first means for automatically accommodating and/or correcting for a lateral offset between the longitudinal axes of the respective threaded members, and second means for automatically accommodating and/or correcting for an angular tipping or non-parallelism between the longitudinal axes of the respective threaded members, wherein the driven threaded member is connected to a holder, the holder being mounted in an adapter, the holder further having a flange formed thereon opposite from the threaded member, a pair of semicircular retainer halves disposed in the adapter, each retainer half having a circumferential groove formed on an internal arcuate surface wherein the flange on the holder is loosely received in the respective grooves and the holder may move laterally in all directions with respect to the surrounding retainer halves, wherein the holder and the connected threaded member automatically accommodate for lateral offset between the longitudinal axes of the respective threaded members.

2. In an apparatus for gaging, tapping and/or re-chasing threaded devices, wherein a driven threaded member having a longitudinal axis engages a cooperating threaded member having a longitudinal axis, and wherein the longitudinal axis of the driving threaded member may be misaligned with respect to the longitudinal axis of the cooperating threaded member, thereby potentially causing a jamming or malfunction of the apparatus, the improvement comprising first means for automatically accommodating and/or correcting for a lateral offset between the longitudinal axes of the respective threaded members, and second means for automatically accommodating and/or correcting for an angular tipping or non-parallelism between the longitudinal axes of the respective threaded members, wherein the driven threaded member is connected to a holder, the holder being mounted in an adapter, the holder further having a flange formed thereon opposite from the driven threaded member, a pair of semi-circular retainer halves disposed in the adapter, each retainer half having an outer peripheral arcuate surface and an inner arcuate surface, each outer arcuate peripheral surface having a respective crown formed thereon, the inner arcuate surface of each retainer half having a circumferential groove formed therein, the flange on the holder being loosely received in the respective grooves, wherein the retainer halves may be displaced angularly about the crown peripheral surface producing angular displacement of the holder and of the driven threaded member.

3. In an apparatus for gaging, tapping and/or re-chasing threaded devices, wherein a driven threaded member having a longitudinal axis engages a cooperating threaded member having a longitudinal axis, and wherein the longitudinal axis of the driving threaded member may be misaligned with respect to the longitudinal axis of the cooperating threaded member, thereby potentially causing a jamming or malfunction of the apparatus, the improvement comprising first means for automatically accommodating and/or correcting for a lateral offset between the longitudinal axes of the respective threaded members, and second means for automatically accommodating and/or correcting for an angular tipping or non-parallelism between the longitudinal axes of the respective threaded members, wherein the driven threaded member is connected to a holder, the holder being mounted in an adapter, the holder further having a flange formed thereon opposite from the driven threaded member, a pair of semicircular retainer halves disposed in the adapter, each retainer half having an outer peripheral arcuate surface and an inner arcuate surface, each outer arcuate peripheral surface having a respective crown formed thereon, the inner arcuate surface of each retainer half having a circumferential groove formed therein, the flange on the holder being loosely received in the respective grooves, the holder having a face on the flange opposite from the connection to the driven threaded member, an axial shaft being connected to the face on the flange, a resilient member being disposed around the axial shaft and urging the flange of the holder producing angular displacement of the holder and of the driven threaded member.

4. The improvement of claim 1, wherein each retainer half is formed of a material having a low coefficient of friction.

5. The improvement of claim 4, wherein the material having a low coefficient of friction is a phenolic invested with PTFE.

6. In an apparatus for gaging, tapping and re-chasing threads in an out-of-position threaded aperture on a first axis in a manufactured part, wherein a cooperating threaded chaser probe on a second axis is alternately advanced within and retracted from the threaded aperture in a relatively high-speed operation, the threaded chaser probe being part of a driven member engaged by a driving member in the apparatus and wherein the first axis of the aperture and the second axis of the threaded chaser probe may be non-parallel and/or angularly displaced from each other, the improvement which comprises the threaded chaser probe being mounted in an adapter, the adapter being connected to the driven member, the adapter having an axial shaft disposed therein, the shaft having a first end engaging the driven member and an opposite second end engaging a probe holder, the probe holder having a flange formed thereon, a pair of semi-circular retainer halves, each retainer half having a circumferential groove formed on an internal arcuate surface thereof, wherein the flange on the probe holder is loosely received in the respective grooves and the probe holder may move laterally in all directions with respect to the surrounding retainer halves, each retainer half being formed from a material having a low coefficient of friction, the threaded chaser probe being attached to the probe holder, a resilient member being disposed around the axis shaft and contacting the flange on the probe holder, wherein the threaded chaser probe may move laterally and angularly with respect to the apparatus to align with the threaded aperture.

7. The apparatus of claim 6, wherein the first end and the second end of the axial shaft are polygonal in shape.

8. The apparatus of claim 6, wherein the threaded chaser probe has a conical-shaped first end which guides the chaser probe into the threaded aperture.

9. The apparatus of claim 6, wherein the threaded chaser probe has a D-shaped second end, the probe holder having a half-round channel formed axially therein to receive the cooperating rounded portion of the second end of the threaded chaser probe, a clamp probe being connected to the probe holder, the clamp probe having a flat side connecting the cooperation flat side of the second end of the threaded chaser probe wherein the threaded chaser probe moves concurrently with the probe holder.

10. The apparatus of claim 6, wherein the retainer halves each have an outer periphery, the outer periphery having a respective crown formed thereon wherein the retainer halves may be displaced with respect to the axial shaft thereby permitting angular displacement of the chaser probe.

* * * * *